(12) United States Patent
Uziel et al.

(10) Patent No.: US 12,423,950 B2
(45) Date of Patent: Sep. 23, 2025

(54) SYSTEM AND METHOD FOR PEDESTRIAN ROAD CROSSING INTENTION DETECTION

(71) Applicant: GM GLOBAL TECHNOLOGY OPERATIONS LLC, Detroit, MI (US)

(72) Inventors: Roy Uziel, Herzliya (IL); Oded Bialer, Petah Tikva (IL); Dan Levi, Ganei Tikvah (IL)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 18/311,393

(22) Filed: May 3, 2023

(65) Prior Publication Data
US 2024/0371132 A1 Nov. 7, 2024

(51) Int. Cl.
| | |
|---|---|
| *G06V 10/764* | (2022.01) |
| *G06V 10/74* | (2022.01) |
| *G06V 10/82* | (2022.01) |
| *G06V 10/98* | (2022.01) |
| *G06V 20/52* | (2022.01) |
| *G06V 20/58* | (2022.01) |
| *G06V 40/10* | (2022.01) |
| *G08G 1/0967* | (2006.01) |

(52) U.S. Cl.
CPC .......... *G06V 10/764* (2022.01); *G06V 10/761* (2022.01); *G06V 10/82* (2022.01); *G06V 10/98* (2022.01); *G06V 20/52* (2022.01); *G06V 20/58* (2022.01); *G06V 40/103* (2022.01); *G08G 1/096775* (2013.01)

(58) Field of Classification Search
CPC ...... G06V 10/764; G06V 20/52; G06V 20/58; G06V 10/761; G06V 10/82; G06V 10/98; G06V 40/103
See application file for complete search history.

(56) References Cited

PUBLICATIONS

Chen, Runnan, Youquan Liu, Lingdong Kong, Xinge Zhu, Yuexin Ma, Yikang Li, Yuenan Hou, Yu Qiao, and Wenping Wang. "Clip2scene: Towards label-efficient 3d scene understanding by clip." In Proceedings of the IEEE/CVF Conference on Computer Vision and Pattern Recognition, pp. 7020-7030. Apr. 6, 2023. (Year: 2023).*

(Continued)

*Primary Examiner* — David Perlman
(74) *Attorney, Agent, or Firm* — Quinn IP Law

(57) ABSTRACT

A system for classifying a road crossing intention of a pedestrian includes a processor including a pretrained image encoder generating an image embedding based upon an input image. The system further includes a remote server receiving the image embedding. The remote server device further references a plurality of pretrained image and text embeddings each corresponding to either a positive road crossing intention or a negative road crossing intention. The remote server device further determines a plurality of proximity values evaluating whether the input image is closer to the positive road crossing intention or the negative road crossing intention, evaluating the image embedding against each of the pretrained embeddings. The remote server device further classifies a road crossing intention of the pedestrian based upon the plurality of proximity values. The system further includes generates a road crossing intention output based upon the road crossing intention of the pedestrian.

20 Claims, 7 Drawing Sheets

(56) References Cited

PUBLICATIONS

Yang, Biao, Weiqin Zhan, Pin Wang, Chingyao Chan, Yingfeng Cai, and Nan Wang. "Crossing or not? Context-based recognition of pedestrian crossing intention in the urban environment." IEEE transactions on intelligent transportation systems 23, No. 6 (2021): 5338-5349. (Year: 2021).*

* cited by examiner

FIG. 8
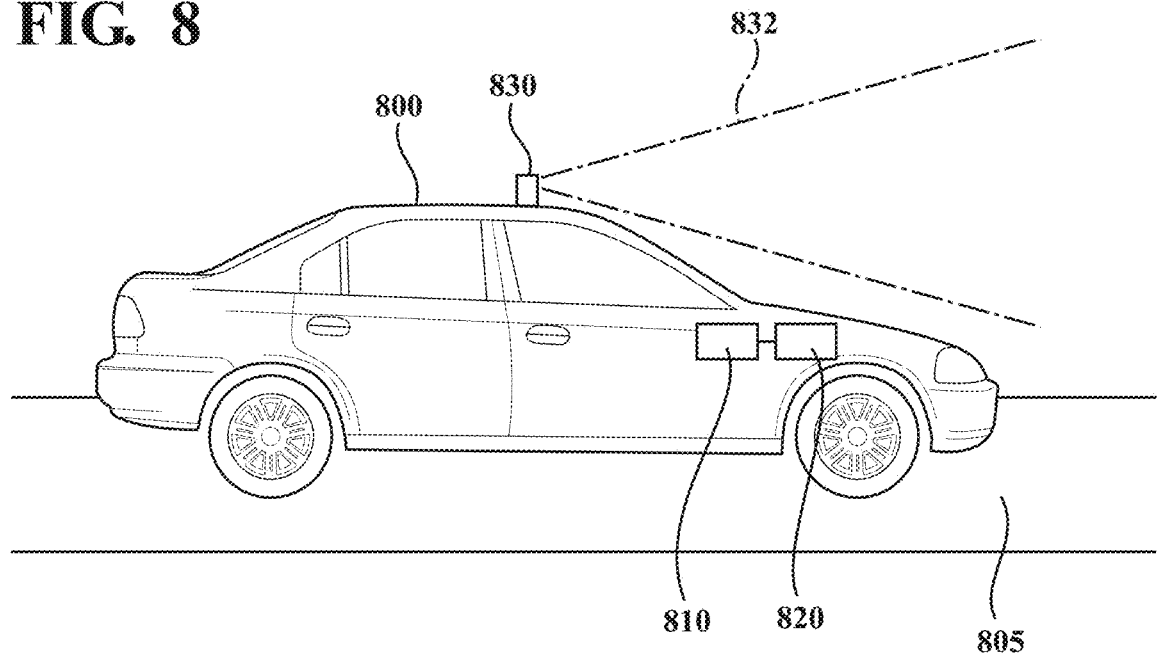
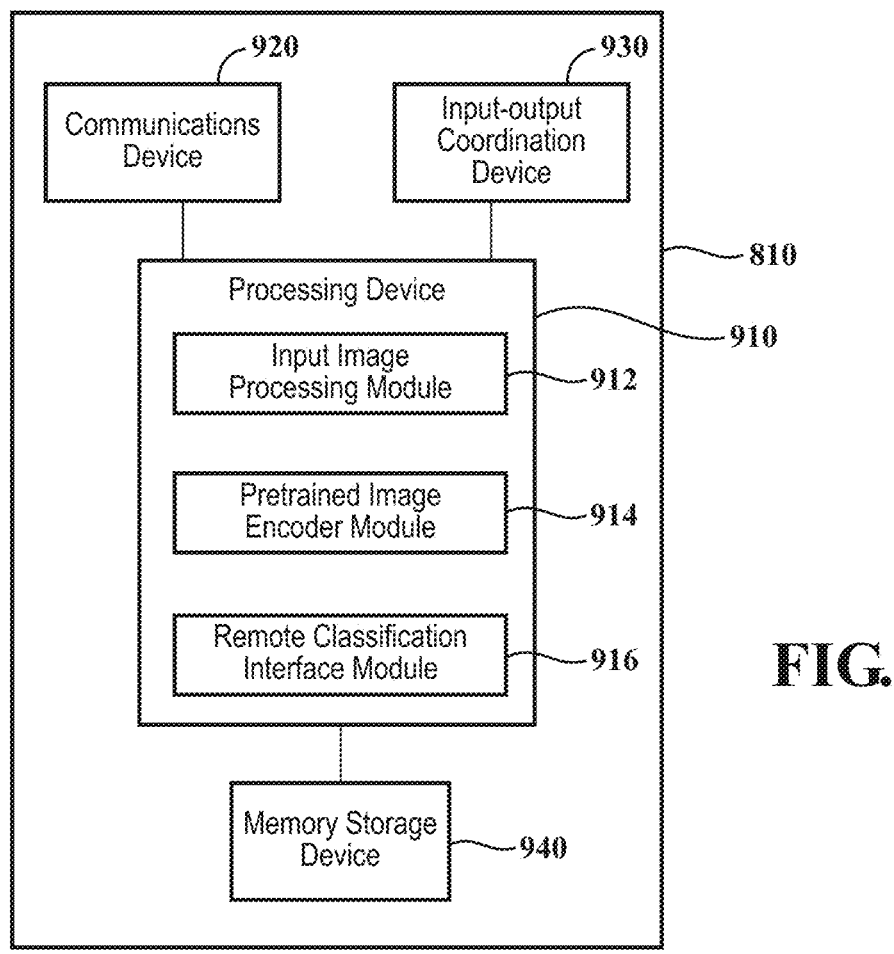
FIG. 9

SYSTEM AND METHOD FOR PEDESTRIAN ROAD CROSSING INTENTION DETECTION

BACKGROUND

The present disclosure relates to a system and method for pedestrian road crossing intention detection with a vision language model.

Vision systems may be utilized in vehicles and other types of systems to determine details about a local operating environment. For example, a camera device, a LIDAR device, or another similar sensor device may be utilized to gather data about an object in the local operating environment. In some embodiments, movement of the object may be tracked or predicted. In one example, one vehicle may employ a vision system to track and predict movement of other vehicles. Vehicles may follow predictable paths, for example, with information useful for prediction provided by lane markings, identification of a vehicle position relative to lane markings, typical maneuvers of a vehicle, and other similar information.

SUMMARY

A computer vision system for classifying a road crossing intention of a pedestrian to a road is provided. The system includes a camera device providing an input image of the pedestrian and a processor including a pretrained image encoder generating an image embedding based upon the input image. The system further includes a remote server device receiving the image embedding from the processor. The remote server device further references a plurality of pretrained image embeddings corresponding to a positive road crossing intention, a plurality of pretrained text caption embeddings corresponding to the positive road crossing intention, a plurality of pretrained image embeddings corresponding to a negative road crossing intention, and a plurality of pretrained corresponding text embeddings corresponding to the negative road crossing intention. The remote server device further determines a plurality of proximity values evaluating whether the input image is closer to the positive road crossing intention or the negative road crossing intention. The plurality of proximity values includes a first portion of the plurality of proximity values including a proximity of the image embedding based upon the input image to each of the plurality of pretrained image embeddings corresponding to the positive road crossing intention and a second portion of the plurality of proximity values including a proximity of the image embedding based upon the input image to each of the plurality of pretrained text caption embeddings corresponding to the positive road crossing intention. The plurality of proximity values further includes a third portion of the plurality of proximity values including a proximity of the image embedding based upon the input image to each of the plurality of pretrained image embeddings corresponding to the negative road crossing intention and a fourth portion of the plurality of proximity values including a proximity of the image embedding based upon the input image to each of the plurality of pretrained corresponding text embeddings corresponding to the negative road crossing intention. The remote server device further classifies a road crossing intention of the pedestrian based upon the plurality of proximity values. The system further includes a computer vision controller. The computer vision controller receives the road crossing intention of the pedestrian and generates a road crossing intention output based upon the road crossing intention of the pedestrian.

In some embodiments, the remote server device further evaluates a classification error of the classifying and iteratively corrects the plurality of pretrained text caption embeddings corresponding to the positive road crossing intention or the plurality of pretrained text caption embeddings corresponding to the negative road crossing intention to minimize the classification error.

In some embodiments, the remote server device includes a neural network, and the neural network determines the plurality of proximity values classifies the road crossing intention.

In some embodiments, the neural network is trained to determine the plurality of proximity values.

In some embodiments, the neural network utilizes the plurality of proximity values as inputs, and the neural network further classifies the road crossing intention as an output.

In some embodiments, classifying the road crossing intention of the pedestrian based upon the plurality of proximity values includes determining an average proximity value of the image embedding corresponding to the positive road crossing intention as an average of the first portion and the second portion and determining an average proximity value of the image embedding corresponding to the negative road crossing intention as an average of the third portion and the fourth portion. Classifying the road crossing intention of the pedestrian based upon the plurality of proximity values includes determining a smaller of the average proximity value of the image embedding corresponding to the positive road crossing intention and the average proximity value of the image embedding corresponding to the negative road crossing intention to determine a minimum overall proximity measure and classifying the road crossing intention based upon the minimum overall proximity measure.

In some embodiments, classifying the road crossing intention of the pedestrian based upon the plurality of proximity values includes determining a minimum proximity value of the image embedding corresponding to the positive road crossing intention as a minimum value of the first portion and the second portion and determining a minimum proximity value of the image embedding corresponding to the negative road crossing intention as a minimum value of the third portion and the fourth portion. Classifying the road crossing intention of the pedestrian based upon the plurality of proximity values further includes determining a smaller of the minimum proximity value of the image embedding corresponding to the positive road crossing intention and the minimum proximity value of the image embedding corresponding to the negative road crossing intention to determine a minimum overall proximity measure and classifying the road crossing intention based upon the minimum overall proximity measure.

In some embodiments, classifying the road crossing intention of the pedestrian based upon the plurality of proximity values includes determining a maximum proximity value of the image embedding corresponding to the positive road crossing intention as a maximum value of the first portion and the second portion and determining a maximum proximity value of the image embedding corresponding to the negative road crossing intention as a maximum value of the third portion and the fourth portion. Classifying the road crossing intention of the pedestrian based upon the plurality of proximity values further includes determining a smaller of the maximum proximity value of the image embedding corresponding to the positive road crossing intention and the maximum proximity value of the image embedding corresponding to the negative road crossing intention to determine a minimum overall proximity measure and classifying the road crossing intention based upon the minimum overall proximity measure.

In some embodiments, the pretrained text caption embeddings corresponding to the positive road crossing intention is trained with text captions including "intending to cross the road", "intend to cross the road", "about to cross the road", "crossing the road", "planning to cross the road", "aiming to cross the road", or "about to be on the road".

In some embodiments, the pretrained image encoder is configured for generating the image embedding including data related to a sidewalk within the input image. The pretrained text caption embeddings corresponding to the negative road crossing intention is trained with text captions including "along the sidewalk", "staying on the sidewalk", "facing away from the road", "away from the road", or "remaining on the sidewalk".

In some embodiments, the camera device is within a vehicle.

In some embodiments the computer vision controller is within the vehicle, and the vehicle generates an alert based upon the road crossing intention output.

In some embodiments, the computer vision controller is an infrastructure device within an operating environment of the pedestrian. The infrastructure device generates an alert based upon the road crossing intention output.

In some embodiments, the processor is within the remote server device.

In some embodiments, the processor is within the computer vision controller.

According to one alternative embodiment, a computer vision system for classifying a road crossing intention of a pedestrian to a road is provided. The system includes a device including a camera device providing an input image of the pedestrian and a computer vision controller including a pretrained image encoder generating an image embedding based upon the input image. The system further includes a remote server device in wireless communication with the device and receiving the image embedding from the computer vision controller. The remote server device further references a plurality of pretrained image embeddings corresponding to a positive road crossing intention and a plurality of pretrained text caption embeddings corresponding to the positive road crossing intention. The remote server device further references a plurality of pretrained image embeddings corresponding to a negative road crossing intention and references a plurality of pretrained corresponding text embeddings corresponding to the negative road crossing intention. The remote server device further determines a plurality of proximity values evaluating whether the input image is closer to the positive road crossing intention or the negative road crossing intention. The plurality of proximity values includes a first portion of the plurality of proximity values including a proximity of the image embedding based upon the input image to each of the plurality of pretrained image embeddings corresponding to the positive road crossing intention and a second portion of the plurality of proximity values including a proximity of the image embedding based upon the input image to each of the plurality of pretrained text caption embeddings corresponding to the positive road crossing intention. The plurality of proximity values further includes a third portion of the plurality of proximity values including a proximity of the image embedding based upon the input image to each of the plurality of pretrained image embeddings corresponding to the negative road crossing intention and a fourth portion of the plurality of proximity values including a proximity of the image embedding based upon the input image to each of the plurality of pretrained corresponding text embeddings corresponding to the negative road crossing intention. The remote server device further classifies a road crossing intention of the pedestrian based upon the plurality of proximity values. The computer vision controller further receives the road crossing intention of the pedestrian and generates a road crossing intention output based upon the road crossing intention of the pedestrian.

In some embodiments, the device is a vehicle.

According to one alternative embodiment, a method for classifying a road crossing intention of a pedestrian to a road is provided. The method includes providing an input image of the pedestrian from a camera device. Within a processor including a pretrained image encoder, the method further includes generating an image embedding based upon the input image. Within a remote server device, the method further includes receiving the image embedding from the processor. Within the remote server device, the method further includes referencing a plurality of pretrained image embeddings corresponding to a positive road crossing intention and referencing a plurality of pretrained text caption embeddings corresponding to the positive road crossing intention. Within the remote server device, the method further includes referencing a plurality of pretrained image embeddings corresponding to a negative road crossing intention and referencing a plurality of pretrained corresponding text embeddings corresponding to the negative road crossing intention. Within the remote server device, the method further includes determining a plurality of proximity values evaluating whether the input image is closer to the positive road crossing intention or the negative road crossing intention. The plurality of proximity values includes a first portion of the plurality of proximity values including a proximity of the image embedding based upon the input image to each of the plurality of pretrained image embeddings corresponding to the positive road crossing intention and a second portion of the plurality of proximity values including a proximity of the image embedding based upon the input image to each of the plurality of pretrained text caption embeddings corresponding to the positive road crossing intention. The plurality of proximity values further includes a third portion of the plurality of proximity values including a proximity of the image embedding based upon the input image to each of the plurality of pretrained image embeddings corresponding to the negative road crossing intention and a fourth portion of the plurality of proximity values including a proximity of the image embedding based upon the input image to each of the plurality of pretrained corresponding text embeddings corresponding to the negative road crossing intention. The method further includes, within the remote server device, classifying a road crossing intention of the pedestrian based upon the plurality of proximity values. Within a computer vision controller, the method further includes receiving the road crossing intention of the pedestrian and generating a road crossing intention output based upon the road crossing intention of the pedestrian.

In some embodiments, the remote server device includes a neural network, and classifying the road crossing intention occurs within the neural network.

In some embodiments, the camera device is within a vehicle, and the computer vision controller is within the vehicle. The method further includes generating an alert within the vehicle based upon the road crossing intention output.

The above features and advantages and other features and advantages of the present disclosure are readily apparent from the following detailed description of the best modes for carrying out the disclosure when taken in connection with the accompanying drawings.

BRIEF DESCRIPTION OF DRAWINGS

FIG. 8 schematically illustrates an exemplary device including a computer vision controller configured to classify an intention of a pedestrian in an input image provided by a camera device, in accordance with the present disclosure;

FIG. 9 schematically illustrates the computer vision controller of FIG. 8, in accordance with the present disclosure.

DETAILED DESCRIPTION

Figure 1:
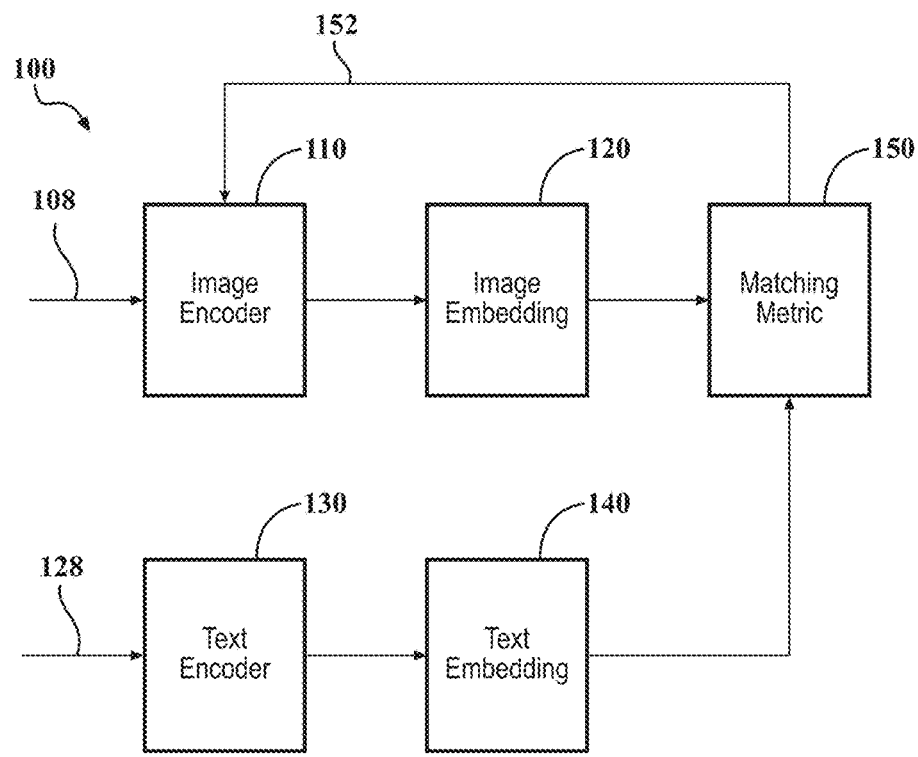
FIG. 1 schematically illustrates a process for a leverage image language model useful to train an image encoder, in accordance with the present disclosure.

A vehicle may follow a readily discernable or predictable path. Pedestrians may be less predictable. A person walking or standing in one position may change direction or start movement with little notice. Detecting the intention of a pedestrian to cross the road is very challenging because it requires scene understanding. Current methods train road crossing classifier based on detection of features that are related to road crossing, such as heading of the pedestrian with respect to road, body pose, and eye gaze. These methods fail to obtain satisfactory accuracy because the relation between the detected features to road crossing is complex and learning it requires many examples.

A computerized system distinguishes between a pedestrian intending to cross a road and the pedestrian not intending to cross the road. The system may analyze the pedestrian's behavior according to a heading with respect to the road, proximity to the road, eye contact with driver, body pose, and other visible attributes. Detecting the pedestrian intent to cross the road requires scene understanding and hence is very challenging.

A system and method for detecting road crossing intention from camera image by a neural network image encoder that learns to relate image embeddings to text caption embedding, and then classifying pedestrian road crossing intention when an image crop of a pedestrian and its vicinity has embedding that is closer to the embeddings of text captions and images of road crossing rather than the embeddings of text captions and images of non-road crossing.

A system and method for detecting road crossing intent by a neural network image encoder that matches image embedding with its text caption and then classifying road crossing intention by matching an image embedding to other text caption and image embeddings of road crossing and non-crossing cases.

In computer vision processes, image embeddings or dense vector representations may be utilized within a Contrastive Language-Image Pre-training (CLIP) model. CLIP is a neural network including a large number of text and image pairs. CLIP is useful to determine whether a text description and an image match. An image encoder receives an input image and creates an image embedding. A text encoder receives an input text description and creates a text embedding. In training the neural network, an image encoder and a text encoder may be utilized together, matching image embeddings to text embeddings to train matching metrics useful to later classify input images. Ideally, each image embedding corresponds to its associated text embedding and is different from all the captions of the other images in the neural network. Such a trained neural network may, for example, receive an input image or an image under test, compare it to an image embedding related to a test criterion, for example, such as a person crossing a roadway, and provide a classifier prediction score such as a matching score percentage, with a high percentage indicating that the image under test is closely matched to the image embedding related to the test criterion.

According to one embodiment of the disclosure, a computer vision system for classifying a road crossing intention of a pedestrian to a road is provided. The system includes a camera device providing an input image of the pedestrian. The system further includes a processor including a pre-trained image encoder generating an image embedding based upon the input image. The system further includes a remote server device. The remote server device receives the image embedding from the processor. The remote server device further referencing a plurality of pretrained image embeddings corresponding to a positive road crossing intention and a plurality of pretrained text caption embeddings corresponding to the positive road crossing intention. The remote server device further references a plurality of pretrained image embeddings corresponding to a negative road crossing intention and a plurality of pretrained corresponding text embeddings corresponding to the negative road crossing intention. The remote server device further determines a plurality of proximity values evaluating whether the input image is closer to the positive road crossing intention or the negative road crossing intention. The plurality of proximity values includes a first portion of the plurality of proximity values including a proximity of the image embedding based upon the input image to each of the plurality of pretrained image embeddings corresponding to the positive road crossing intention and a second portion of the plurality of proximity values including a proximity of the image embedding based upon the input image to each of the plurality of pretrained text caption embeddings corresponding to the positive road crossing intention. The plurality of proximity values further includes a third portion of the plurality of proximity values including a proximity of the image embedding based upon the input image to each of the plurality of pretrained image embeddings corresponding to the negative road crossing intention and a fourth portion of the plurality of proximity values including a proximity of the image embedding based upon the input image to each of the plurality of pretrained corresponding text embeddings corresponding to the negative road crossing intention. The remote server device further classifies a road crossing intention of the pedestrian based upon the plurality of proximity values. The system further includes a computer vision controller. The computer vision controller receives the road crossing intention of the pedestrian and generates a road crossing intention output based upon the road crossing intention of the pedestrian.

The system may operate to reduce classification error over time. The remote server device may evaluate a classification error of the classifying and iteratively correct the plurality of pretrained text caption embeddings corresponding to the positive road crossing intention or the plurality of pretrained text caption embeddings corresponding to the negative road crossing intention to minimize the classification error.

The system may utilize a variety of methods or processes to classify the road crossing intention of the pedestrian. In one embodiment, the remote server device may includes a neural network configured to classify the road crossing intention. The neural network may be trained to determine the plurality of proximity values. The neural network may utilize the plurality of proximity values as inputs. The neural network may classify the road crossing intention as an output.

In another embodiment, classifying the road crossing intention of the pedestrian based upon the plurality of proximity values may includes evaluating how close the image embedding that was created based upon the input image is to a first group of exemplary image or text embeddings corresponding to a positive road crossing intention and to a second ground of exemplary image or text embeddings corresponding to a negative road crossing intention. Being close to the first group or the second group may be used to indicate correlation between the input image and either the positive or negative road crossing intention. In a first exemplary comparison to determine closeness, the remote server device may determine an average proximity value of the image embedding corresponding to the positive road crossing intention as an average of the first portion and the second portion and determine an average proximity value of the image embedding corresponding to the negative road crossing intention as an average of the third portion and the fourth portion. The remote server device may further determine a smaller of the average proximity value of the image embedding corresponding to the positive road crossing intention and the average proximity value of the image embedding corresponding to the negative road crossing intention to determine a minimum overall proximity measure and may classify the road crossing intention based upon the minimum overall proximity measure.

In a second exemplary comparison to determine closeness, the remote server device may determine a minimum proximity value of the image embedding corresponding to the positive road crossing intention as a minimum value of the first portion and the second portion and determine a minimum proximity value of the image embedding corresponding to the negative road crossing intention as a minimum value of the third portion and the fourth portion. The remote server device may further determine a smaller of the minimum proximity value of the image embedding corresponding to the positive road crossing intention and the minimum proximity value of the image embedding corresponding to the negative road crossing intention to determine a minimum overall proximity measure and may classify the road crossing intention based upon the minimum overall proximity measure.

In a third exemplary comparison to determine closeness, the remote server device may determine a maximum proximity value of the image embedding corresponding to the positive road crossing intention as a maximum value of the first portion and the second portion and determine a maximum proximity value of the image embedding corresponding to the negative road crossing intention as a maximum value of the third portion and the fourth portion. The remote server device may further determine a smaller of the maximum proximity value of the image embedding corresponding to the positive road crossing intention and the maximum proximity value of the image embedding corresponding to the negative road crossing intention to determine a minimum overall proximity measure and classify the road crossing intention based upon the minimum overall proximity.

FIG. 1 schematically illustrates a process 100 for a leverage image language model useful to train an image encoder 110. The process 100 is illustrated including the image encoder 110, an image embedding 120 created by the image encoder 110, a text encoder 130, a text embedding 140 created by the text encoder, and a matching metric 150. An input image 108 is provided to the image encoder 110, and the image encoder 110 creates the image embedding 120. A text caption 128 of the input image 108 is provided to the text encoder 130, the text encoder 130 creates the text embedding 140. The image embedding 120 and the text embedding 140 are provided to the matching metric 150. The matching metric 150 provides feedback 152 to update the image encoder 110. The process 100 may be utilized to train the image encoder 110 to match text captions 128 over a large set of input images 108. The process 100 is useful to obtain image embeddings with semantics. Process 100 may be operated in a remote server device useful to provide a neural network trained to receive an image under test from a vehicle, process the image under test, and provide a classifier prediction score comparing the image under test to a test criterion. Applied to a predictive model to or pedestrian road crossing intention detection, the process 100 may be utilizing to train a neural network to include 1) positive road crossing intention representative embeddings and 2) negative road crossing intention representative embeddings.

Figure 2:
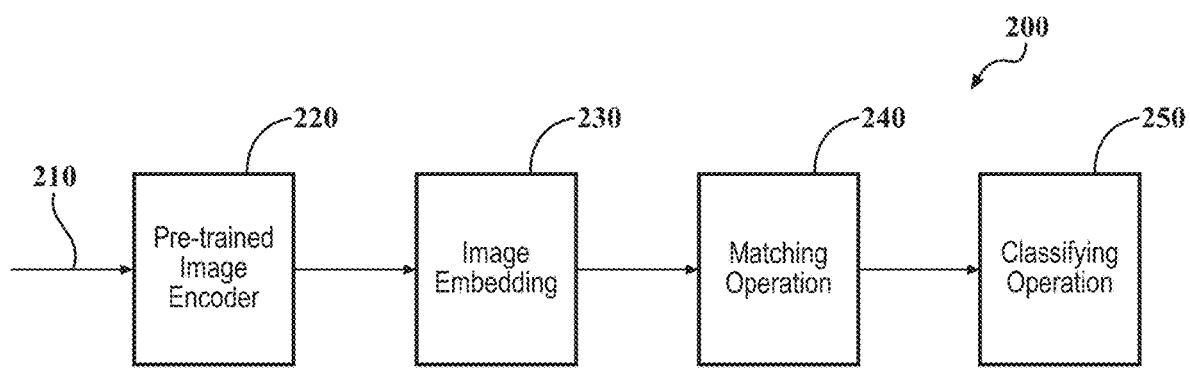
FIG. 2 schematically illustrates a process to classify an image under test as matching a positive road crossing intention or a negative road crossing intention, in accordance with the present disclosure.

FIG. 2 schematically illustrates a process 200 to classify an image under test 210 as matching a positive road crossing intention or a negative road crossing intention. The process 200 is illustrated including a pre-trained image encoder 220, an image embedding 230, a matching operation 240 of the image embedding 230 with positive crossing embeddings and negative crossing embeddings, and a classifying operation 250 of a positive road crossing intention or a negative road crossing intention by proximity to the positive crossing embeddings and the negative crossing embeddings. The image under test 210 is provided to the pre-trained image encoder 220, and the image embedding 230 is created. The image embedding 230 is provided to the matching operation 240, which may match the image embedding 230 with a plurality of positive road crossing intention representative embeddings to generate a first classifier prediction score or a positive road crossing intention classifier prediction score.

The matching operation 240 further may match the image embedding 230 with a plurality of negative road crossing intention representative embeddings to generate a second classifier prediction score or a negative road crossing intention classifier prediction score. The classifier prediction score or scores generated by the matching operation 240 may be described as a matching metric describing proximity of the image under test to the representative embeddings. The classifier prediction score or scores generated by the matching operation 240 may be utilized by the classifying operation 250 to predict whether a pedestrian is likely or unlikely to cross a road. Such as prediction of the impending action of the pedestrian may be utilized by a plurality of alternative systems or computerized controllers, for example, by an autonomous navigation system to control a vehicle to avoid the pedestrian, by a warning system to warn a driver of a vehicle that a pedestrian is about to cross the roadway, by a warning system to sound an alarm to the pedestrian if an unsafe condition is detected, or to an infrastructure signaling system, for example, to light a flashing sign on the side of the roadway that a pedestrian is crossing.

Figure 3:
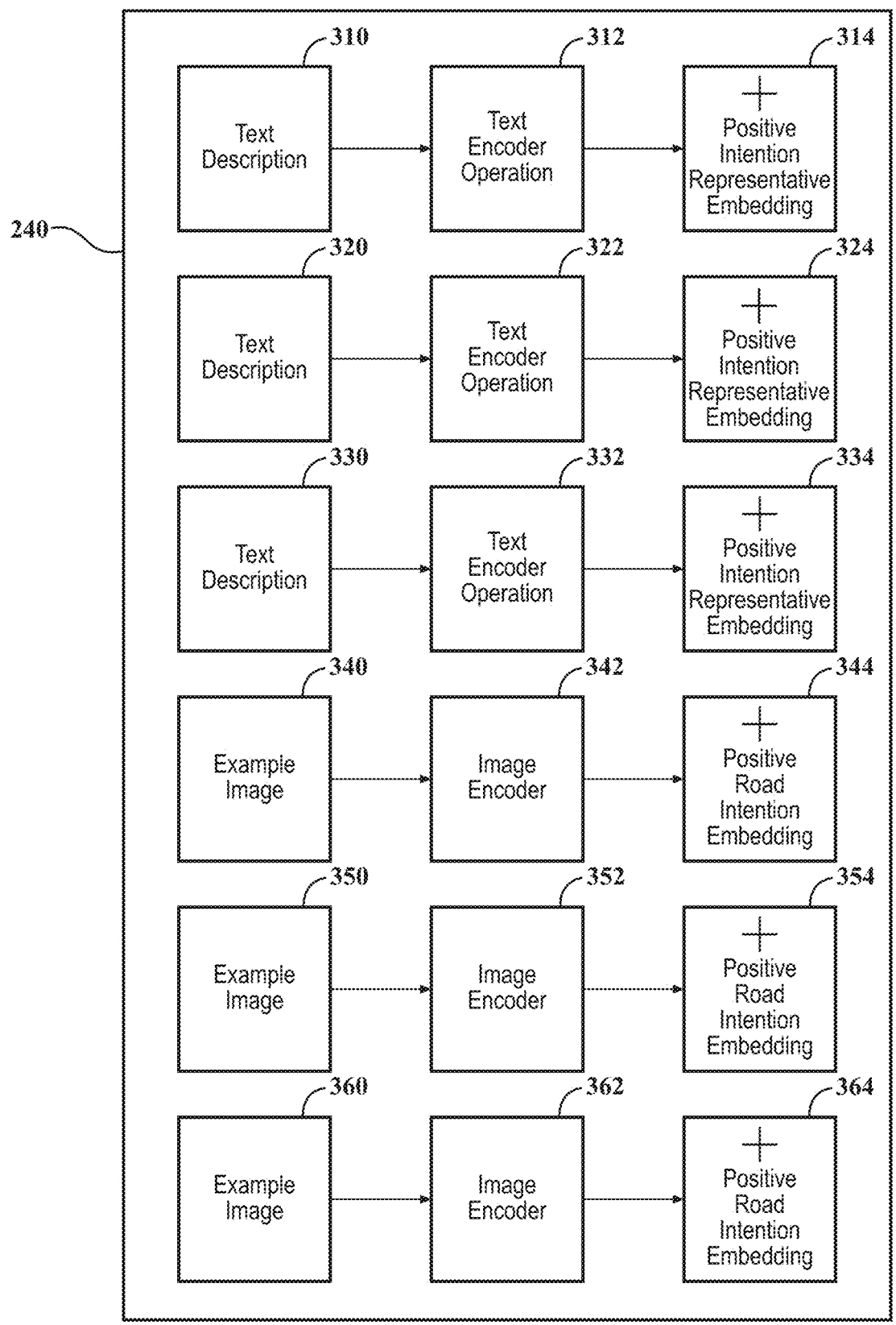
FIG. 3 schematically illustrates the matching operation of FIG. 2 comparing the image embedding of FIG. 2 to a plurality of positive road crossing intention representative embeddings, in accordance with the present disclosure.

FIG. 3 schematically illustrates the matching operation 240 of FIG. 2 comparing the image embedding 230 of FIG. 2 to a plurality of positive road crossing intention representative embeddings 314, 324, 334, 344, 354, 364. A plurality of text descriptions 310, 320, 330 indicating a likely intent of a pedestrian to cross a street is provided. In one example, text description 310 may include "intending to cross the road", text description 320 may include "about to cross the road", and text description 330 may include "crossing the road". Text descriptions 310, 320, 330 are exemplary, and a large plurality of text descriptions may be utilized. Each of the text descriptions 310, 320, 330 are processed through a corresponding text encoder operation 312, 322, 332, respectively, to generate respective the positive road crossing intention representative embeddings 314, 324, 334.

Similarly, a plurality of images 340, 350, 360 indicating a likely intent of a pedestrian to cross a street is provided. The images may include or be selected to include examples of pedestrians exhibiting behavior indicative of intending to cross the road. These examples may include a pedestrian facing a roadway, close to a roadway, looking at traffic upon the roadway, moving toward the roadway, pressing a crosswalk button, standing in a crosswalk designated waiting area, or exhibiting other similar behavior. The images 340, 350, 360 are exemplary, and a large plurality of images may be utilized. Each of the images 340, 350, 360 are processed through a corresponding image encoder operation 342, 352, 362, respectively, to generate respective the positive road crossing intention representative embeddings 344, 354, 364. The matching operation 240 determines a local classifier prediction score of the image embedding 230 to each of the positive road crossing intention representative embeddings 314, 324, 334, 344, 354, 364, and a net or average classifier prediction score for a positive road crossing intention or the positive road crossing intention classifier prediction score may be determined based upon the local classifier prediction scores.

Figure 4:
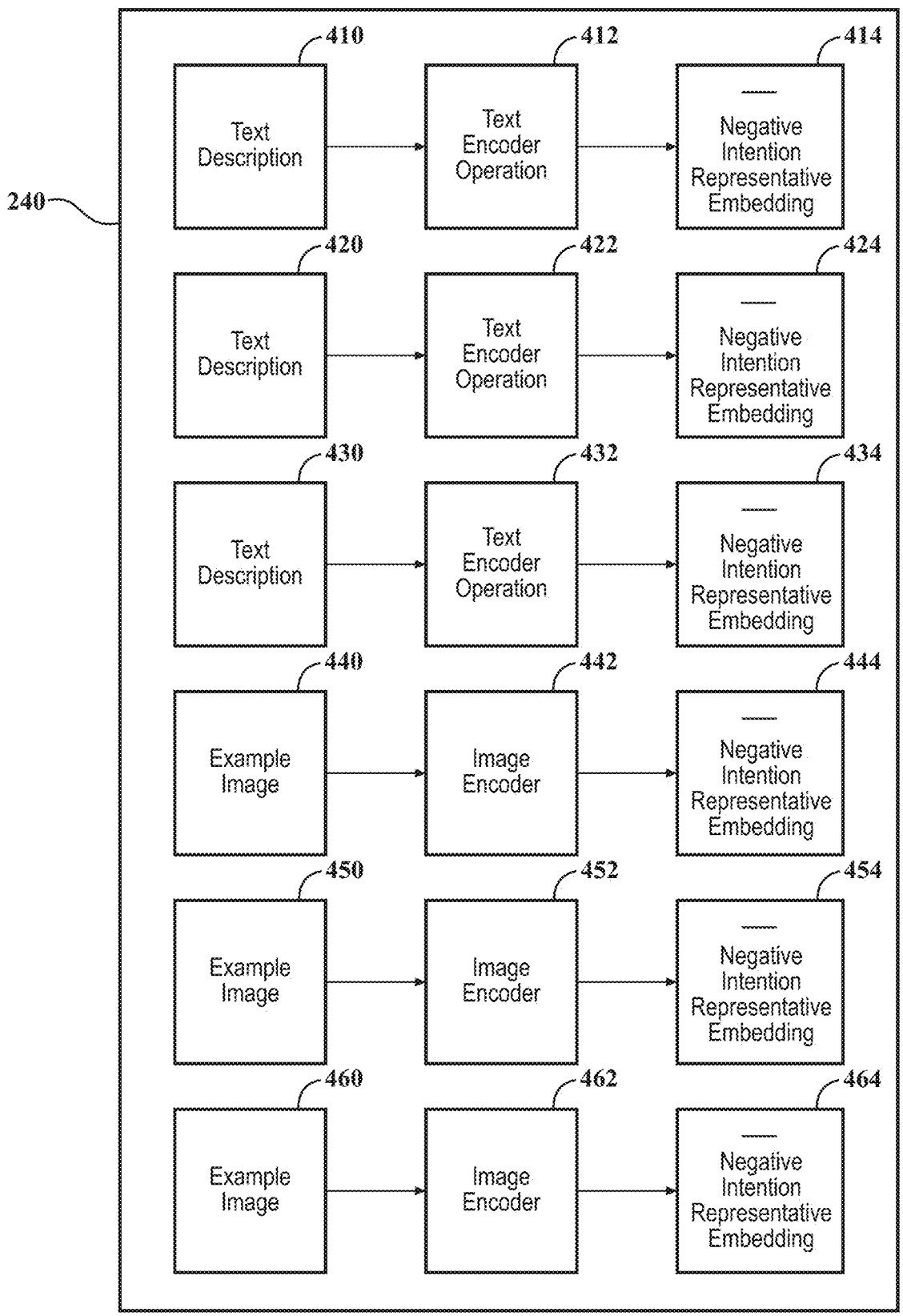
FIG. 4 schematically illustrates the matching operation of FIG. 2 comparing the image embedding of FIG. 2 to a plurality of negative road crossing intention representative embeddings, in accordance with the present disclosure.

FIG. 4 schematically illustrates the matching operation 240 of FIG. 2 comparing the image embedding 230 of FIG. 2 to a plurality of negative road crossing intention representative embeddings 414, 424, 434, 444, 454, 464. A plurality of text descriptions 410, 420, 430 indicating a likely intent of a pedestrian not to cross a street is provided. In one example, text description 410 may include "along the sidewalk", text description 420 may include "staying on the sidewalk", and text description 430 may include "facing away from the road". Text descriptions 410, 420, 430 are exemplary, and a large plurality of text descriptions may be utilized. Each of the text descriptions 410, 420, 430 are processed through a corresponding text encoder operation 412, 422, 432, respectively, to generate respective the negative road crossing intention representative embeddings 414, 424, 434.

Similarly, a plurality of images 440, 450, 460 indicating a likely intent of a pedestrian not to cross a street is provided. The images may include or be selected to include examples of pedestrians exhibiting behavior indicative of not intending to cross the road. These examples may include a pedestrian facing away from a roadway, being distant from a roadway, looking away from traffic upon the roadway, moving away from the roadway, walking along the sidewalk maintaining a constant distance from the roadway, or exhibiting other similar behavior. The images 440, 450, 460 are exemplary, and a large plurality of images may be utilized. Each of the images 440, 450, 460 are processed through a corresponding image encoder operation 442, 452, 462, respectively, to generate respective the negative road crossing intention representative embeddings 444, 454, 464. The matching operation 240 determines a local classifier prediction score of the image embedding 230 to each of the negative road crossing intention representative embeddings 414, 424, 434, 444, 454, 464, and a net or average classifier prediction score for a negative road crossing intention or the negative road crossing intention classifier prediction score may be determined based upon the local classifier prediction scores.

Figure 10:
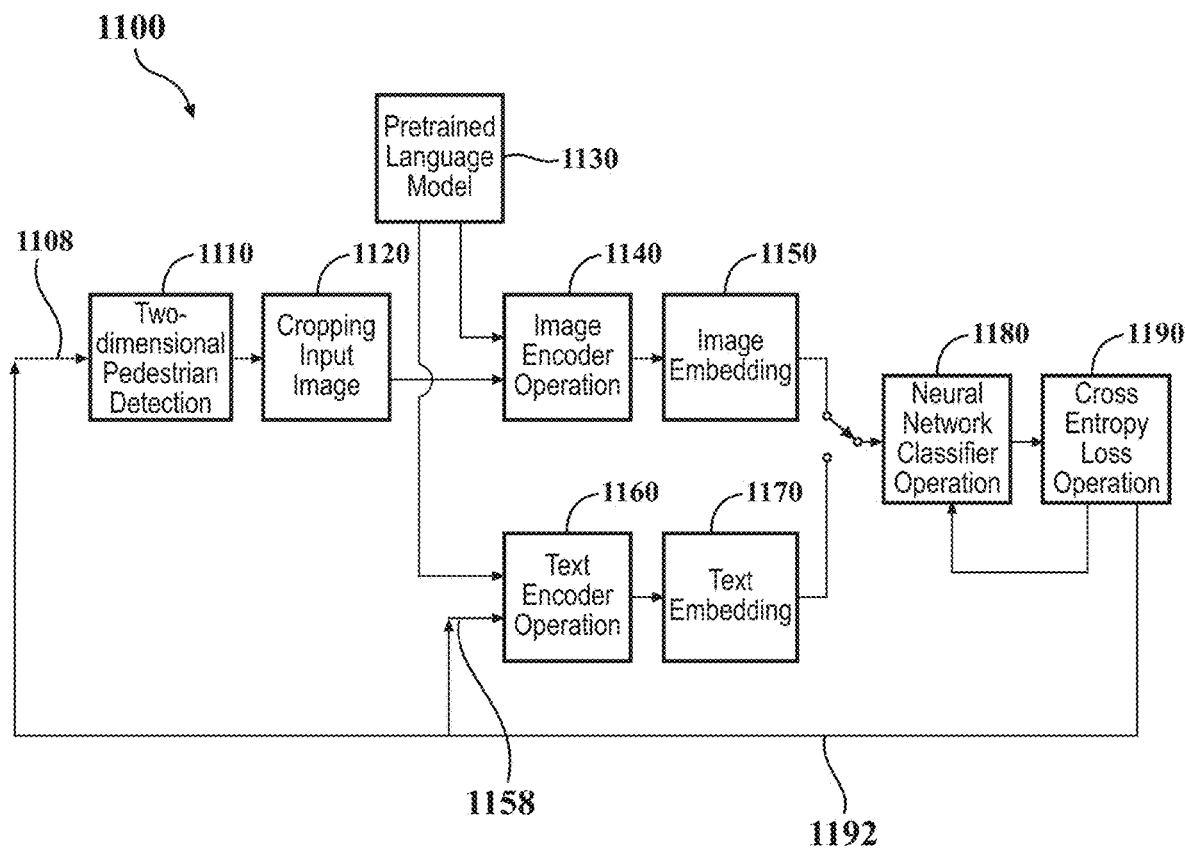
FIG. 10 schematically illustrates a process for operating a training stage of a neural network, in accordance with the present disclosure.

FIG. 10 schematically illustrates a process 1100 for operating a training stage of a neural network. A selected input image 1108 including either a positive or a negative cross intention representative embedding to be used later in matching operations is illustrated being received by a two-dimensional pedestrian detection operation 1110. At operation 1120, a portion of the input image 1108 including the pedestrian and details in an immediate vicinity of the pedestrian are cropped or isolated from the input image 1108. At an image encoder operation 1140, the cropped portion of the input image 1108 including the pedestrian and the vicinity around the pedestrian is received. Additionally, data from a pretrained language model 1130 is provided to the image encoder operation 1140. The image encoder operation 1140 processes the cropped portion of the input image 1108 and the data from the pretrained language model 1130 and generated an image embedding 1150. Additionally, a text prompt 1158 selected based upon the positive or negative road crossing intention representative embedding corresponding to the cropped portion of the input image 1108 is provided to a text encoder operation 1160. The text encoder operation 1160 further receives data from the pretrained language model 1130. The text encoder operation 1160 processes the text prompt and the data from the pretrained language model 1130 and generates a text embedding 1170 corresponding to the image embedding 1150. A neural network classifier operation 1180 is illustrated including an input switch configured for selectively receiving the image embedding 1150 and the text embedding 1170. The neural network classifier operation 1180 classifies the cropped portion of the input image 1108 as either predicting a positive road crossing intention or a negative road crossing intention. An output of the neural network classifier operation 1180 may be described as a road crossing intention probability. The road crossing intention probability is provided to a cross entropy loss operation 1190, which provides an update to inputs to the process 1100. The process 1100 may be used to train classifiers for each image in a set of representative images and text prompts. The process 1100 may include input images 1108 and corresponding text prompts 1158 to train both positive road crossing intention and negative road crossing intention. A user may select representative images for the input images 1108 and corresponding text prompts of positive and negative road crossing intention classes such that classification cross entropy loss is minimized over a validation set.

Figure 5:
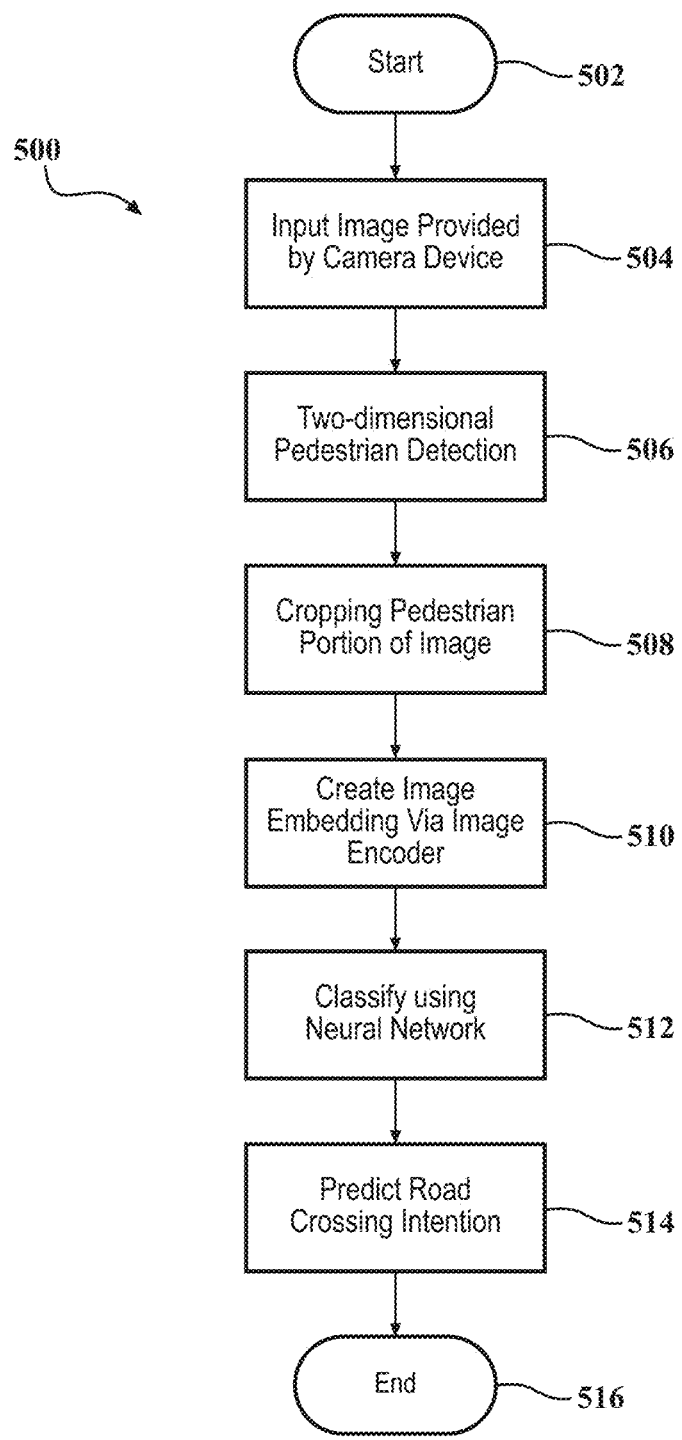
FIG. 5 schematically illustrates a method to be utilized by an in-vehicle computer vision controller including a pre-trained image encoder and a neural network to classify a road crossing intention of a pedestrian, in accordance with the present disclosure.

FIG. 5 schematically illustrates a method 500 to utilized by an in-vehicle computer vision controller including a pretrained image encoder and a neural network to classify a road crossing intention of a pedestrian. The method 500 starts at step 502. At step 504, an input image including a pedestrian is provided by a camera device monitoring an operating environment of the vehicle. At step 506, the input image is processed by a two-dimensional pedestrian detection operation, wherein a portion of the input image including the pedestrian and its immediate vicinity is identified. At step 508, the portion of the input image including the pedestrian is cropped. At step 510, the cropped portion of the input image is provided to an image encoder operation, wherein an image embedding is created. At step 512, a neural network is utilized to classify the image embedding as being predictive of a positive road crossing intention or a negative road crossing intention. At step 514, a road crossing intention of the pedestrian is predicted. The step 514 may include classification of a plurality of images or iterative analysis of behavior of the pedestrian to predict the intention of the pedestrian with increased confidence. The method 500 ends at step 516. The method 500 is provided as an exemplary method to utilize a pretrained image encoder and a neural network to classify an intention of a pedestrian observed in an input image. A number of additional or alternative method steps are envisioned, and the disclosure is not intended to be limited to the examples provided.

Figure 6:
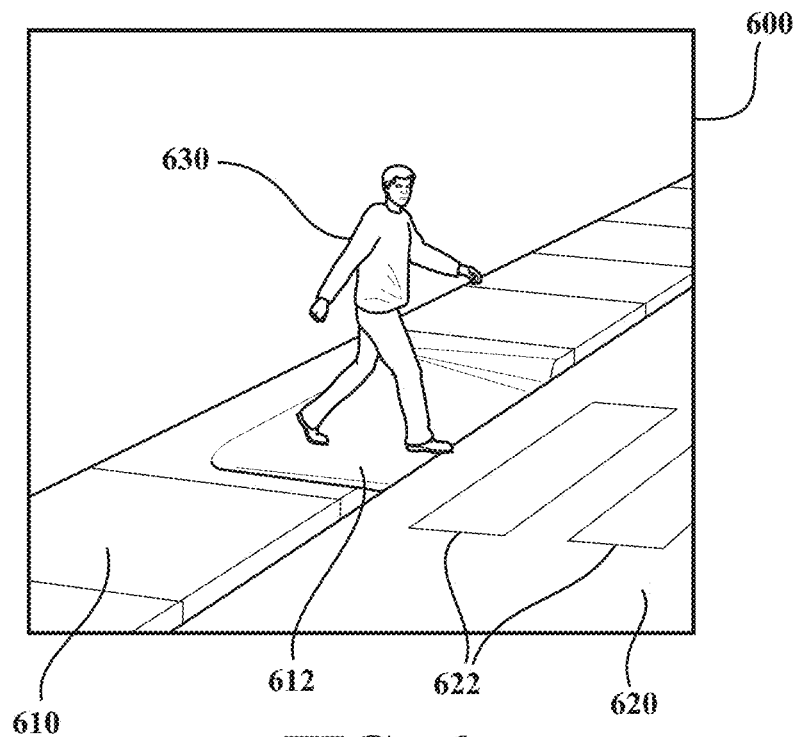
FIG. 6 illustrates an exemplary image including a pedestrian exhibiting behavior indicative of a positive intention to cross a road, in accordance with the present disclosure.

FIG. 6 illustrates an exemplary image 600 including a pedestrian 630 exhibiting behavior indicative of a positive intention to cross a road 620. The image 600 includes the pedestrian 630 standing upon a sidewalk 610 in an area including cross walk geometry 612 including crosswalk paint markings and a ramped curb. The road 620 is illustrated including crosswalk paint features 622. The pedestrian 630 is illustrated facing the road 620 and the crosswalk paint features 622 and is illustrated gazing toward a lane of oncoming traffic. The details of the image 600 clearly indicate a positive road crossing intention of the pedestrian 630. The image 600 may be paired with a text description including "ready to cross". The image 600 and the paired text description may be utilized to create positive road crossing intention representative embeddings for use in a neural network as described herein. The image 600, if collected as data by a camera device of a vehicle, an infrastructure system, or other similar system, may be processed according to the method 500 of FIG. 5 to classify an intention of the pedestrian 630 to cross the road 620.

Figure 7:
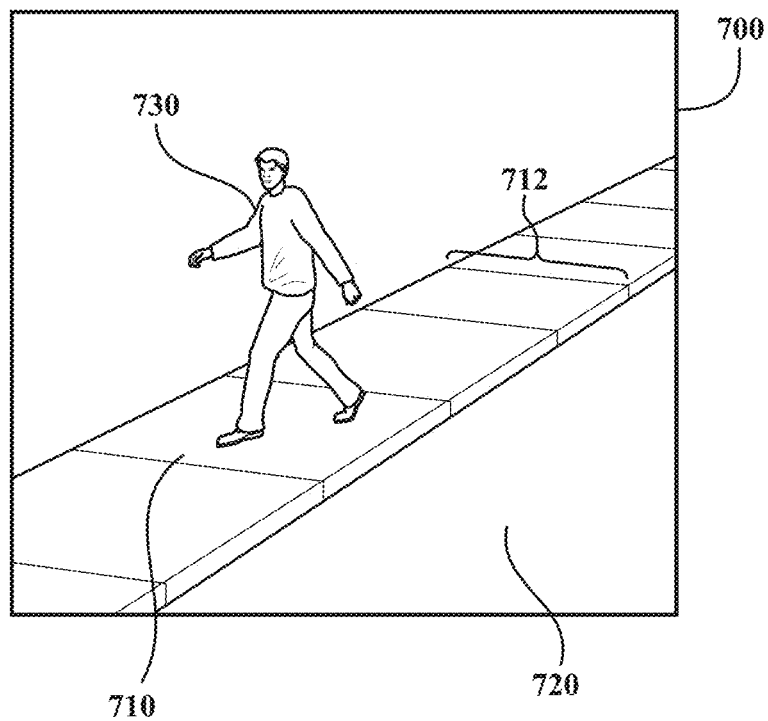
FIG. 7 illustrates an exemplary image including a pedestrian exhibiting behavior indicative of a negative intention to cross or an intention not to cross a road, in accordance with the present disclosure.

FIG. 7 illustrates an exemplary image 700 including a pedestrian 730 exhibiting behavior indicative of a negative intention to cross or an intention not to cross a road 720. The image 700 includes the pedestrian 730 walking down a sidewalk 710. The sidewalk 710 runs parallel to the road 720, such that a person such as pedestrian 730 walking down the sidewalk 710 travels alongside the road 720 without crossing the road 720. The pedestrian 730 is illustrated not facing the road 720. The pedestrian 730 is illustrated some threshold distance 712 away from the road 720. The eyes of the pedestrian 730 are not gazing towards the road 720 or traffic thereupon. The details of the image 700 clearly indicate a negative road crossing intention of the pedestrian 730 or an intention of the pedestrian 730 not to cross the road 720. The image 700 may be paired with a text description including "staying on the sidewalk". The image 700 and the paired text description may be utilized to create negative road crossing intention representative embeddings for use in a neural network as described herein. The image 700, if collected as data by a camera device of a vehicle, an infrastructure system, or other similar system, may be processed according to the method 500 of FIG. 5 to classify an intention of the pedestrian 730 to not cross the road 720.

FIG. 8 schematically illustrates an exemplary device 800 including a computer vision controller 810 configured to classify an intention of a pedestrian in an input image provided by a camera device 830. The device 800 includes an exemplary vehicle upon a road 805. The device 800 is illustrated including the computer vision controller 810 in communication with an exemplary navigation controller 820. The device 800 is further illustrated including the camera device 830 capturing images in a perspective 832. The device 800 is further illustrated including a communications device 840 configured for wireless communication over a wireless communication network. A remote server device 850 is additionally illustrated. The remote server device 850 may be in communication with the device 800 and may operate a neural network useful to classify a road crossing intention of a pedestrian in an image provided by the camera device 830. The device 800 is exemplary, and other devices or systems may employ the disclosed computer vision controller 810. The device 800 may issue an alert to a user, for example, "pedestrian about to cross" or a similar alarm. A displayed map within the device 800 may be updated with pedestrian information.

The disclosed system may be utilized within device 800 including a vehicle. In another embodiment, the disclosed system may be utilized within an infrastructure device, such as fixed device 860. The fixed device 860 may communicate wirelessly with the remote server device 850, may include a camera device, a processor, and may include an output medium to generate a crossing pedestrian alert, in accordance with the present disclosure.

FIG. 9 schematically illustrates the computer vision controller 810. The computer vision controller 810 includes a computerized processing device 910, a communications device 920, an input output coordination device 930, and a memory storage device 940. It is noted that the computer vision controller 810 may include other components and some of the components are not present in some embodiments.

The processing device 910 may include memory, e.g., read only memory (ROM) and random-access memory (RAM), storing processor-executable instructions and one or more processors that execute the processor-executable instructions. In embodiments where the processing device 910 includes two or more processors, the processors may operate in a parallel or distributed manner. The processing device 910 may execute the operating system of the computer vision controller 810. Processing device 910 may include one or more modules executing programmed code or computerized processes or methods including executable steps. Illustrated modules may include a single physical device or functionality spanning multiple physical devices. The processing device 910 may further include programming modules, including an input image processing module 912, a pretrained image encoder module 914, and a remote classification interface module 916. In one embodiment, the computer vision controller 810 or portions thereof may include electronic versions of the processing device.

The communications device 920 may include a communications/data connection with a bus device configured to transfer data to different components of the system and may include one or more wireless transceivers for performing wireless communication.

The input output coordination device 930 includes hardware and/or software configured to enable the processing device 910 to receive and/or exchange data with on-board sensors of the host vehicle and to provide control of switches, modules, and processes throughout the vehicle based upon determinations made within processing device 910.

The memory storage device 940 is a device that stores data generated or received by the computer vision controller 810. The memory storage device 940 may include, but is not limited to, a hard disc drive, an optical disc drive, and/or a flash memory drive.

The input image processing module 912 includes programming configured for receiving and processing an input image, for example, including a two-dimensional pedestrian detection operation and an operation to crop a portion of an input image including the pedestrian and an immediate vicinity of the pedestrian. The input image processing module 912 may further include programming, for example, to track a location or movement of an identified pedestrian through a plurality of iterative images. The input image processing module 912 may further include programming to predict movement of a pedestrian behind an obstacle, for example, behind a telephone pole, such that the pedestrian may further be predicted to reemerge from behind the telephone pole in a subsequent image. The input image processing module 912 may output a cropped input image including the pedestrian to the pretrained image encoder module 914.

The pretrained image encoder module 914 includes programming to generate an image embedding based upon the cropped image provided by the input image processing module 912.

The image embedding generated by the pretrained image encoder module 914 is useful to compare to positive and negative road crossing intention reference embeddings. The remote classification interface module 916 communicates with a remote server device over a wireless communications network to utilize a comparing operation in the remote server device to classify an intention of the pedestrian in the image embedding according to the present disclosure. The remote classification interface module 916 receives classification of the pedestrian's road crossing intention from the remote server device and utilizes the pedestrian's road crossing intention as an output to other vehicle systems.

The computer vision controller 810 is provided as an exemplary computerized device capable of executing programmed code to operate the disclosed process. A number of different embodiments of the computer vision controller 810 and modules operable therein are envisioned, and the disclosure is not intended to be limited to examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A computer vision system for classifying a road crossing intention of a pedestrian, the system comprising:
   a camera device providing an input image of the pedestrian;
   a processor including a pretrained image encoder configured for generating an image embedding based upon the input image;
   a remote server device configured for:
      receiving the image embedding from the processor;
      referencing a plurality of pretrained image embeddings corresponding to a positive road crossing intention;
      referencing a plurality of pretrained text caption embeddings corresponding to the positive road crossing intention;
      referencing a plurality of pretrained image embeddings corresponding to a negative road crossing intention;
      referencing a plurality of pretrained corresponding text embeddings corresponding to the negative road crossing intention;
      determining a plurality of proximity values evaluating whether the input image is closer to the positive road crossing intention or the negative road crossing intention, the plurality of proximity values including:
         a first portion of the plurality of proximity values including a proximity of the image embedding based upon the input image to each of the plurality of pretrained image embeddings corresponding to the positive road crossing intention;
         a second portion of the plurality of proximity values including a proximity of the image embedding based upon the input image to each of the plurality of pretrained text caption embeddings corresponding to the positive road crossing intention;
         a third portion of the plurality of proximity values including a proximity of the image embedding based upon the input image to each of the plurality of pretrained image embeddings corresponding to the negative road crossing intention; and
         a fourth portion of the plurality of proximity values including a proximity of the image embedding based upon the input image to each of the plurality of pretrained corresponding text embeddings corresponding to the negative road crossing intention; and
      classifying a road crossing intention of the pedestrian based upon the plurality of proximity values; and
   a computer vision controller configured for:
      receiving the road crossing intention of the pedestrian; and
      generating a road crossing intention output based upon the road crossing intention of the pedestrian.

2. The system of claim 1, wherein the remote server device is further configured for:
   evaluating a classification error of the classifying; and
   iteratively correcting the plurality of pretrained text caption embeddings corresponding to the positive road crossing intention or the plurality of pretrained text caption embeddings corresponding to the negative road crossing intention to minimize the classification error.

3. The system of claim 1, wherein the remote server device includes a neural network; and wherein the neural network is configured for classifying the road crossing intention.

4. The system of claim 3, wherein the neural network is trained to determine the plurality of proximity values.

5. The system of claim 3, wherein the neural network is configured for utilizing the plurality of proximity values as inputs; and
wherein the neural network is further configured for classifying the road crossing intention as an output.

6. The system of claim 1, wherein classifying the road crossing intention of the pedestrian based upon the plurality of proximity values includes:
determining an average proximity value of the image embedding corresponding to the positive road crossing intention as an average of the first portion and the second portion;
determining an average proximity value of the image embedding corresponding to the negative road crossing intention as an average of the third portion and the fourth portion;
determining a smaller of the average proximity value of the image embedding corresponding to the positive road crossing intention and the average proximity value of the image embedding corresponding to the negative road crossing intention to determine a minimum overall proximity measure; and
classifying the road crossing intention based upon the minimum overall proximity measure.

7. The system of claim 1, wherein classifying the road crossing intention of the pedestrian based upon the plurality of proximity values includes:
determining a minimum proximity value of the image embedding corresponding to the positive road crossing intention as a minimum value of the first portion and the second portion;
determining a minimum proximity value of the image embedding corresponding to the negative road crossing intention as a minimum value of the third portion and the fourth portion;
determining a smaller of the minimum proximity value of the image embedding corresponding to the positive road crossing intention and the minimum proximity value of the image embedding corresponding to the negative road crossing intention to determine a minimum overall proximity measure; and
classifying the road crossing intention based upon the minimum overall proximity measure.

8. The system of claim 1, wherein classifying the road crossing intention of the pedestrian based upon the plurality of proximity values includes:
determining a maximum proximity value of the image embedding corresponding to the positive road crossing intention as a maximum value of the first portion and the second portion;
determining a maximum proximity value of the image embedding corresponding to the negative road crossing intention as a maximum value of the third portion and the fourth portion;
determining a smaller of the maximum proximity value of the image embedding corresponding to the positive road crossing intention and the maximum proximity value of the image embedding corresponding to the negative road crossing intention to determine a minimum overall proximity measure; and
classifying the road crossing intention based upon the minimum overall proximity measure.

9. The system of claim 1, wherein the pretrained text caption embeddings corresponding to the positive road crossing intention are trained with text captions including "intending to cross the road", "intend to cross the road", "about to cross the road", "crossing the road", "planning to cross the road", "aiming to cross the road", or "about to be on the road".

10. The system of claim 1, wherein the pretrained image encoder is configured for generating the image embedding including data related to a sidewalk within the input image; and
wherein the pretrained text caption embeddings corresponding to the negative road crossing intention are trained with text captions including "along the sidewalk", "staying on the sidewalk", "facing away from the road", "away from the road", or "remaining on the sidewalk".

11. The system of claim 1, wherein the camera device is within a vehicle.

12. The system of claim 11, wherein the computer vision controller is within the vehicle; and wherein the vehicle generates an alert based upon the road crossing intention output.

13. The system of claim 1, wherein the computer vision controller is an infrastructure device within an operating environment of the pedestrian; and
wherein the infrastructure device generates an alert based upon the road crossing intention output.

14. The system of claim 1, wherein the processor is within the remote server device.

15. The system of claim 1, wherein the processor is within the computer vision controller.

16. A computer vision system for classifying a road crossing intention of a pedestrian, the system comprising:
a device including:
a camera device providing an input image of the pedestrian;
a computer vision controller including a pretrained image encoder configured for generating an image embedding based upon the input image;
a remote server device in wireless communication with the device configured for:
receiving the image embedding from the computer vision controller;
referencing a plurality of pretrained image embeddings corresponding to a positive road crossing intention;
referencing a plurality of pretrained text caption embeddings corresponding to the positive road crossing intention;
referencing a plurality of pretrained image embeddings corresponding to a negative road crossing intention;
referencing a plurality of pretrained corresponding text embeddings corresponding to the negative road crossing intention;
determining a plurality of proximity values evaluating whether the input image is closer to the positive road crossing intention or the negative road crossing intention, the plurality of proximity values including:
a first portion of the plurality of proximity values including a proximity of the image embedding based upon the input image to each of the plurality of pretrained image embeddings corresponding to the positive road crossing intention;
a second portion of the plurality of proximity values including a proximity of the image embedding based upon the input image to each of the plurality of pretrained text caption embeddings corresponding to the positive road crossing intention;
a third portion of the plurality of proximity values including a proximity of the image embedding based upon the input image to each of the plurality of pretrained image embeddings corresponding to the negative road crossing intention; and a fourth portion of the plurality of proximity values including a proximity of the image embedding based upon the input image to each of the plurality of pretrained corresponding text embeddings corresponding to the negative road crossing intention; and classifying a road crossing intention of the pedestrian based upon the plurality of proximity values; and wherein the computer vision controller is further configured for:

receiving the road crossing intention of the pedestrian; and generating a road crossing intention output for use within the device based upon the road crossing intention of the pedestrian.

17. The system of claim 16, wherein the device is a vehicle.

18. A method for classifying a road crossing intention of a pedestrian, the method comprising:

providing an input image of the pedestrian from a camera device;

within a processor including a pretrained image encoder, generating an image embedding based upon the input image;

within a remote server device:

receiving the image embedding from the processor;

referencing a plurality of pretrained image embeddings corresponding to a positive road crossing intention;

referencing a plurality of pretrained text caption embeddings corresponding to the positive road crossing intention;

referencing a plurality of pretrained image embeddings corresponding to a negative road crossing intention;

referencing a plurality of pretrained corresponding text embeddings corresponding to the negative road crossing intention;

determining a plurality of proximity values evaluating whether the input image is closer to the positive road crossing intention or the negative road crossing intention, the plurality of proximity values including:

a first portion of the plurality of proximity values including a proximity of the image embedding based upon the input image to each of the plurality of pretrained image embeddings corresponding to the positive road crossing intention;

a second portion of the plurality of proximity values including a proximity of the image embedding based upon the input image to each of the plurality of pretrained text caption embeddings corresponding to the positive road crossing intention;

a third portion of the plurality of proximity values including a proximity of the image embedding based upon the input image to each of the plurality of pretrained image embeddings corresponding to the negative road crossing intention; and a fourth portion of the plurality of proximity values including a proximity of the image embedding based upon the input image to each of the plurality of pretrained corresponding text embeddings corresponding to the negative road crossing intention; and classifying a road crossing intention of the pedestrian based upon the plurality of proximity values; and within a computer vision controller:

receiving the road crossing intention of the pedestrian; and generating a road crossing intention output based upon the road crossing intention of the pedestrian.

19. The method of claim 18, wherein the remote server device includes a neural network; and wherein classifying the road crossing intention occurs within the neural network.

20. The method of claim 18, wherein the camera device is within a vehicle;

wherein the computer vision controller is within the vehicle; and further comprising generating an alert within the vehicle based upon the road crossing intention output.

* * * * *